United States Patent
He et al.

(10) Patent No.: US 11,939,681 B1
(45) Date of Patent: Mar. 26, 2024

(54) PLANT COMPOSITE CORROSION INHIBITOR FOR OIL FIELD AND PREPARATION METHOD THEREOF

(71) Applicant: Southwest Petroleum University, Chengdu (CN)

(72) Inventors: San He, Chengdu (CN); YongLi Zou, Chengdu (CN); XinYue Cai, Chengdu (CN); YueYing Zhao, Chengdu (CN); MengYu Xie, Chengdu (CN); AnLin Yao, Chengdu (CN); ZongMing Yuan, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 18/469,487

(22) Filed: Sep. 18, 2023

(30) Foreign Application Priority Data

Jul. 10, 2023 (CN) .......................... 202310839059.9

(51) Int. Cl.
*C23F 11/00* (2006.01)
*C23F 11/10* (2006.01)
*C23F 11/12* (2006.01)

(52) U.S. Cl.
CPC ............ *C23F 11/122* (2013.01); *C23F 11/00* (2013.01); *C23F 11/10* (2013.01); *C23F 11/12* (2013.01)

(58) Field of Classification Search
None
See application file for complete search history.

(56) References Cited

U.S. PATENT DOCUMENTS

| | | | |
|---|---|---|---|
| 7,407,623 B2 * | 8/2008 | Whitekettle | ............ A23L 27/70 |
| | | | 210/755 |
| 2005/0121650 A1 * | 6/2005 | Whitekettle | ........ C23F 11/1673 |
| | | | 252/387 |

FOREIGN PATENT DOCUMENTS

| CN | 103114289 A | 5/2013 |
|---|---|---|
| CN | 108823570 A | 11/2018 |
| CN | 114684931 A | 7/2022 |

* cited by examiner

*Primary Examiner* — Joseph D Anthony

(57) ABSTRACT

A a plant composite corrosion inhibitor for an oil field and a preparation method thereof belong to the technical field of preparation of oil field chemical agents. The plant composite corrosion inhibitor comprises a first plant ingredient, a second plant ingredient, a corrosion inhibition synergist and an organic solvent. The first plant ingredient is zeaxanthin and a derivative thereof obtained by supercritical $CO_2$ extraction of marigold; the second plant ingredient is prepared from luffa leaves, guava leaves and eclipta according to a mass ratio of 5:8:9; the corrosion inhibition synergist is prepared by mixing potassium iodide, 8-hydroxyquinoline and sodium dodecyl benzene sulfonate according to a mass ratio of 3:4:2; and the organic solvent is ethanol with a mass concentration of 82%. The composite corrosion inhibitor has a good corrosion inhibition effect, and reduces harmful chemical ingredients in the corrosion inhibitor.

5 Claims, 4 Drawing Sheets

PLANT COMPOSITE CORROSION INHIBITOR FOR OIL FIELD AND PREPARATION METHOD THEREOF

CROSS REFERENCE TO RELATED APPLICATIONS

This application claims foreign priority of Chinese Patent Application No. 202310839059.9, filed on Jul. 10, 2023 in the China National Intellectual Property Administration, the disclosures of all of which are hereby incorporated by reference.

TECHNICAL FIELD

The present invention belongs to the technical field of preparation of oil field chemical agents, and particularly relates to a plant composite corrosion inhibitor for an oil field and a preparation method thereof.

BACKGROUND OF THE PRESENT INVENTION

The process of oil-gas field development is often accompanied with a serious metal corrosion problem, and the use of corrosion inhibitors is the most common and economical method for metal corrosion prevention. The corrosion inhibitors are convenient to use, and can achieve a good corrosion inhibition effect with a low concentration only. Common corrosion inhibitors may be divided into inorganic corrosion inhibitors and organic corrosion inhibitors according to chemical structures. Most inorganic corrosion inhibitors contain phosphorus, sulfur, nitrogen, oxygen, and other highly electronegative atoms, such as arsenate, phosphate and chromate. Most organic corrosion inhibitors contain organic heterocyclic compounds with unsaturated bonds or large conjugated systems, such as amide, Schiff base and pyridine. Although the above corrosion inhibitors have good corrosion inhibition efficiency, the corrosion inhibitors are complex in synthetic route, expensive, non-biodegradable, and usually toxic, and the large-amount use of the corrosion inhibitors is easy to cause red tide and algae proliferation, thus leading to the eutrophication of water body, and damaging a soil environment. Therefore, it is necessary to find a corrosion inhibitor with high corrosion inhibition efficiency and environmental friendliness.

Researches show that organic compounds containing an unsaturated structure, a $\pi$ bond, and C, N, S, O and other heteroatoms in plants are easy to be adsorbed on a metal surface to form a layer of protective film with a protection effect, which is a potential corrosion inhibitor capable of inhibiting metal corrosion. So far, there have been many cases in which plant extracts are used as the corrosion inhibitors, such as orange peels, shaddock peels, aloe, broadleaf holly leaves, ginkgo fruits and olive leaves, all of which have a good corrosion inhibition effect. Because the plants are non-toxic, pollution-free and biodegradable, and have little harm to human body and environment during preparation and use, the plants are the orientation of the corrosion inhibitor and the technical development thereof. However, current plant corrosion inhibitors also have the following problems of: unstable property in use, easy decomposition and deterioration, large dosage, and sharply reduced corrosion inhibition efficiency after environmental condition change.

SUMMARY OF PRESENT INVENTION

The present invention relates to a plant composite corrosion inhibitor for an oil field and a preparation method thereof, solves problems of unstable property in use, easy decomposition and deterioration, large dosage, harsh in application condition, difficult application to engineering practice, and the like of an existing plant extract, and improves various corrosion inhibition performances of the plant corrosion inhibitor.

In order to achieve the above object, the following technical solution is used in the present invention.

A plant composite corrosion inhibitor for an oil field comprises the following raw materials in parts by mass: 15 parts to 25 parts of first plant ingredient, 9 parts to 18 parts of second plant ingredient, 6 parts to 9 parts of corrosion inhibition synergist, and 30 parts to 50 parts of organic solvent.

A raw material of the first plant ingredient is marigold, and raw materials of the second plant ingredient are luffa leaves, guava leaves and eclipta.

Further, preparation steps of the first plant ingredient comprise: washing fresh marigold, disinfecting the washed marigold with anhydrous ethanol, drying the disinfected marigold at 40° C., then grinding and crushing the dried marigold, placing obtained marigold powder in an extraction kettle of a supercritical extractor, using supercritical $CO_2$ as a solvent to flow upwardly at a constant flow rate of 0.012 kg/min for 6 hours, using anhydrous ethanol as a co-solvent to send into a preheating container in front of the extraction kettle through a high performance liquid chromatography pump, wherein the extraction kettle has an extraction pressure of 36.7 MPa and an extraction temperature of 40.5° C., when each cycle is ended, depressurizing an effluent flow in a heated back pressure valve, collecting an extract in a cooled two-chamber collection container, dissolving zeaxanthin and a derivative thereof in ethanol, and removing the solvent by evaporation to obtain the first plant ingredient.

Further, preparation steps of the second plant ingredient specifically comprise: washing, disinfecting, drying and crushing fresh luffa leaves, guava leaves and eclipta according to a mass ratio of 5:8:9, adding anhydrous ethanol according to a liquid-material ratio of 13 mL/g, soaking the mixture for 36 hours, carrying out normal temperature ultrasonic treatment on the soaked mixture by an ultrasonic cleaner for 30 minutes, then removing an insoluble substance by depressurized suction filtration, and concentrating the solution to ⅓ volume through rotary evaporation at 80° C. by a rotary evaporator to obtain the second plant ingredient.

Further, the corrosion inhibition synergist is prepared by mixing potassium iodide, 8-hydroxyquinoline and sodium dodecyl benzene sulfonate according to a mass ratio of 3:4:2.

Further, the organic solvent is ethanol with a mass concentration of 82%.

A preparation method of the plant composite corrosion inhibitor for the oil field according to the present invention comprises the following steps of:
  (1) raw material preparation: preparing the first plant ingredient, the second plant ingredient and the corrosion inhibition synergist for later use; and
  (2) preparation: adding the first plant ingredient, the second plant ingredient and the corrosion inhibition synergist in different parts by mass into the organic solvent, and uniformly stirring and mixing the mixture to obtain the plant composite corrosion inhibitor.

Compared with the prior art, the present invention has the beneficial effects as follows.
  (1) According to the present invention, a natural green plant extract selected contains a flavonoid compound, an amino acid and a polysaccharide substance, wherein zeaxanthin and orientin both have great adsorption energy, and N and O atoms in a polar group of the extract form coordination bonds with empty d-orbitals of the metal atoms to be adsorbed on a metal surface. By using the natural green plant extract as one of main ingredients of the corrosion inhibitor, harmful chemical ingredients in the corrosion inhibitor are reduced, and new idea and perspective are provided for the development and design of a novel efficient corrosion inhibitor in the future.

(2) According to the present invention, two different plant extraction methods are used, and in supercritical fluid extraction, a diffusion coefficient of the supercritical $CO_2$ is nearly 100 times that of the liquid, so that the supercritical $CO_2$ can quickly penetrate into micropores in the marigold powder, and the zeaxanthin and the derivative thereof can be extracted quickly and efficiently. In ultrasonic extraction, the plant may release more effective substances in a short time, so as to accelerate the release, dissolution and diffusion of effective substances in cells.

(3) According to the present invention, the raw materials used to prepare the plant composite corrosion inhibitor all belong to common plants in daily life, and by adjusting a cooperativity and a compatibility between the plant extract and the surfactant, problems of unstable property, harsh application condition and difficult application to engineering practice of an existing plant extract corrosion inhibitor are solved, thus being suitable for large-scale popularization and use in the oil field.

Other advantages, objects and features of the present invention will be partially reflected by the following description, and will be partially understood by those skilled in the art through researching and practicing the present invention.

DETAILED DESCRIPTION OF PREFERRED EMBODIMENTS

Figure 1:
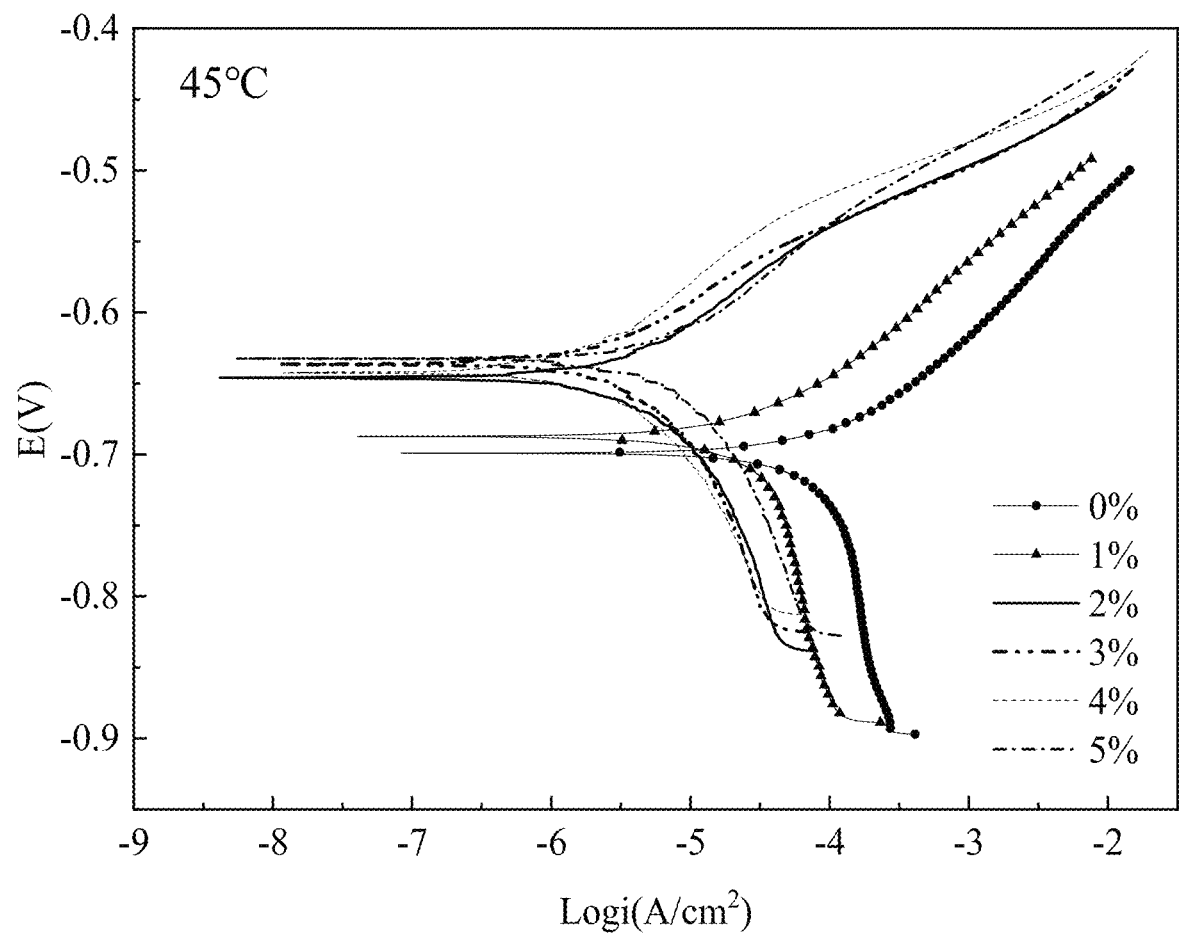
FIG. 1 is a polarization curve graph of L245N steel in Embodiment 3 in corrosion solutions with different concentrations of corrosion inhibitors.

The preferred embodiments of the present invention are described hereinafter with reference to the drawings. It should be understood that the preferred embodiments described herein are only used for describing and explaining the present invention and are not intended to limit the present invention.

Embodiment 1

A plant composite corrosion inhibitor for an oil field comprised the following raw materials in parts by mass: 15 parts of first plant ingredient, 9 parts of second plant ingredient, 6 parts of corrosion inhibition synergist, and 30 parts of organic solvent. The organic solvent was ethanol with a mass concentration of 82%, and a solubility of each ingredient of the composite corrosion inhibitor was high in an ethanol solution.

A raw material of the first plant ingredient was marigold. Extraction steps of the first plant ingredient comprised: washing fresh marigold, disinfecting the washed marigold with anhydrous ethanol, drying the disinfected marigold at 40° C., then grinding and crushing the dried marigold, placing obtained marigold powder in an extraction kettle of a supercritical extractor, using supercritical $CO_2$ as a solvent to flow upwardly at a constant flow rate of 0.012 kg/min for 6 hours, using anhydrous ethanol as a co-solvent to change a polarity of $CO_2$ and send into a preheating container in front of the extraction kettle through a high performance liquid chromatography pump, wherein the extraction kettle has an extraction pressure of 36.7 MPa and an extraction temperature of 40.5° C., when each cycle is ended, depressurizing an effluent flow in a heated back pressure valve, collecting an extract in a cooled two-chamber collection container, dissolving zeaxanthin and a derivative thereof in ethanol, and removing the solvent by evaporation to obtain the first plant ingredient.

Raw materials of the second plant ingredient were luffa leaves, guava leaves and eclipta. Extraction steps of the second plant ingredient comprised: washing, disinfecting, drying and crushing fresh luffa leaves, guava leaves and eclipta according to a mass ratio of 5:8:9, adding anhydrous ethanol according to a liquid-material ratio of 13 mL/g, soaking the mixture for 36 hours, carrying out normal temperature ultrasonic treatment on the soaked mixture by an ultrasonic cleaner for 30 minutes at ultrasonic power of 125 W, then removing an insoluble substance by depressurized suction filtration, and concentrating the solution to ⅓ volume through rotary evaporation at 80° C. by a rotary evaporator to obtain the second plant ingredient.

The corrosion inhibition synergist was prepared by mixing potassium iodide, 8-hydroxyquinoline and sodium dodecyl benzene sulfonate according to a mass ratio of 3:4:2, and could further improve a corrosion inhibition effect of the corrosion inhibitor as a surfactant.

A preparation method of the plant composite corrosion inhibitor of the embodiment comprised the following steps of:

(1) raw material preparation: preparing the first plant ingredient, the second plant ingredient and the corrosion inhibition synergist for later use; and (2) preparation: adding the first plant ingredient, the second plant ingredient and the corrosion inhibition synergist in different parts by mass into the organic solvent, and uniformly stirring and mixing the mixture to obtain the plant composite corrosion inhibitor.

Embodiment 2

The embodiment was basically the same as Embodiment 1, with a difference that: raw materials of various ingredients in the composite corrosion inhibitor accounted for different mass fractions.

A plant composite corrosion inhibitor for an oil field comprised the following raw materials in parts by mass: 20 parts of first plant ingredient, 13 parts of second plant ingredient, 6 parts of corrosion inhibition synergist, and 36 parts of organic solvent. The organic solvent was ethanol with a mass concentration of 82%.

Embodiment 3

The embodiment was basically the same as Embodiment 1, with a difference that: raw materials of various ingredients in the composite corrosion inhibitor accounted for different mass fractions.

A plant composite corrosion inhibitor for an oil field comprised the following raw materials in parts by mass: 20 parts of first plant ingredient, 15 parts of second plant ingredient, 7 parts of corrosion inhibition synergist, and 42 parts of organic solvent. The organic solvent was ethanol with a mass concentration of 82%.

Embodiment 4

The embodiment was basically the same as Embodiment 1, with a difference that: raw materials of various ingredients in the composite corrosion inhibitor accounted for different mass fractions.

A plant composite corrosion inhibitor for an oil field comprised the following raw materials in parts by mass: 25 parts of first plant ingredient, 15 parts of second plant ingredient, 8 parts of corrosion inhibition synergist, and 46 parts of organic solvent. The organic solvent was ethanol with a mass concentration of 82%.

Performance Test 1 of Composite Corrosion Inhibitor

Performances of the composite corrosion inhibitors in Embodiments 1 to 4 were tested, and a corrosion inhibition efficiency experimental method (weight loss method) commonly used in the industry was used for evaluation. The method was summarized as follows.

A corrosion solution was simulated oil field produced water saturated with $CO_2$, with ingredients shown in Table 1 below, a corrosion temperature of 45° C., and a normal pressure. An L245N steel sheet commonly used in the oil field was taken as a corrosion object, the L245N steel was cut into 50 mm×10 mm×3 mm metal samples, and the metal samples were polished with waterproof abrasive paper until surfaces were smooth mirror surfaces, then washed with deionized water, acetone and anhydrous ethanol, and dried and then weighed. The samples were soaked in the corrosion solution added with the corrosion inhibitor at a volume ratio of 4%, and subjected to a weight loss experiment for three days. Under the same conditions, mass differences of the samples of Embodiments 1 to 4 before and after corrosion were calculated, and the efficiency of the corrosion inhibitor was calculated. Results were expressed in mass percentage, as shown in Table 2 below.

Average corrosion rates of the samples could be calculated by the weight loss method, by a calculation formula as follows:

$$v = \frac{8.76 \times 10^7 \times (M - M_1)}{S \times t \times D}$$

wherein v was the corrosion rate, mm/y; M was a mass of the sample before the experiment, g; $M_1$ was a mass of the sample after the experiment, g; S was a total area of the sample, $cm^2$; t was an experimental time, h; and D was a density of the material, $kg/m^3$. A metal material studied was the L245N steel, with a density of 7,840 $kg/m^3$.

A calculation formula of corrosion inhibition efficiency of the corrosion inhibitor was as follows:

$$\eta = \frac{v_0 - v_{inh}}{v_0} \times 100\%$$

wherein η was the corrosion inhibition efficiency, %; and $v_0$ and $v_{inh}$ were corrosion rates before and after adding the corrosion inhibitor respectively, mm/y.

TABLE 1

Formula of corrosion solution

| Chemical reagent | NaCl | KCl | $CaCl_2$ | $MgCl_2 \cdot 6H_2O$ | $Na_2SO_4$ | $NaHCO_3$ |
|---|---|---|---|---|---|---|
| Concentration (g/L) | 16.5577 | 0.5400 | 0.4500 | 1.1178 | 0.3700 | 1.6490 |

TABLE 2

Performance test results of composite corrosion inhibitor

| Embodiment | Inhibitor concentration % v/v | Inhibition rate % |
|---|---|---|
| Embodiment 1 | 4 | 86.2 |
| Embodiment 2 | 4 | 91.5 |
| Embodiment 3 | 4 | 95.6 |
| Embodiment 4 | 4 | 92.3 |

It can be seen from comparison of experimental results of Embodiments 1 to 4 that the plant composite corrosion inhibitor has a good corrosion inhibition performance, which indicates that the technical solution provided by the present invention is effective.

By comparison of Embodiments 1 to 4, when proportions of the first plant ingredient and the second plant ingredient are increased, there is a positive impact on the corrosion inhibition effect of the composite corrosion inhibitor, and the corrosion inhibition effect is enhanced. However, the proportions should not be too high, and a distribution ratio of the composite corrosion inhibitor in Embodiment 3 is the optimum ratio.

Performance Test 2 of Composite Corrosion Inhibitor

According to the present invention, corrosion resistance of the composite corrosion inhibitor prepared in Embodiment 3 was studied as follows by an electrochemical method and corrosion morphology analysis.

① Electrochemical test: the L245N steel was cut into 10 mm×10 mm×3 mm square metal blocks, and surfaces of the square metal blocks were polished, and then cured and packaged with an epoxy resin. A traditional three-electrode system was used in an electrochemical experiment, and the electrochemical experiment was carried out in a CS350 (Wuhan Corrtest Instruments Co., Ltd.) electrochemical workstation. A working electrode was made of the L245N steel, a reference electrode was a saturated calomel electrode, and an auxiliary electrode was a platinum electrode. The experiment was carried out in a constant-temperature water bath at 45° C.

A concentration of the corrosion inhibitor was expressed as a volume ratio of the corrosion inhibitor to the corrosion solution. When a polarization curve was tested, a scanning potential range was set to be a relative open circuit potential of ±200 mV, a potentiodynamic scanning rate was set to be 0.166 mV/s, and then, required related parameters were obtained through fitting by a Tafel extrapolation method. The corrosion inhibition efficiency ($\eta$) was obtained by a formula as follows:

$$\eta = \frac{I_{corr}^0 - I_{corr}}{I_{corr}^0} \times 100\%$$

wherein $\eta$ was the corrosion inhibition efficiency, %; and $I_{corr}^0$ and $I_{corr}$ were corrosion current densities before and after adding the corrosion inhibitor respectively, $\mu A/cm^2$.

② Surface morphology observation: the samples of the L245N steel used for morphology observation had a size of 50 mm×10 mm×3 mm, and were polished until the surfaces were bright, then corroded in corrosion solutions not added with the corrosion inhibitor and added with the corrosion inhibitor respectively for 24 hours at a corrosion temperature of 45° C., and dried, and then corrosion morphologies of the samples were observed by a scanning electron microscope.

FIG. 1 shows polarization curves of the corrosion experiment of the L245N steel in corrosion solutions with different concentrations (0% to 5%) of corrosion inhibitors. After the corrosion inhibitor was added, a corrosion potential shifted positively, and a cathode part and an anode part of a curve both moved in a direction of a low current value, which indicated that cathode and anode reactions were both effectively suppressed. Electrochemical parameters such as a corrosion potential $E_{corr}$, a corrosion current density $I_{corr}$, an anode Tafel slope $B_a$ and a cathode Tafel slope $B_c$ were obtained by graph fitting. Calculation results are shown in Table 3 below.

TABLE 3

Experimental results of corrosion inhibition

| Temperature (° C.) | Inhibitor concentration (% v/v) | $E_{corr}$ (mV) | $I_{corr}$ ($\mu A/cm^2$) | $B_a$ (mV) | $B_c$ (mV) | $\eta$ (%) |
|---|---|---|---|---|---|---|
| 45 | blank | −699.08 | 189.66 | 106.68 | 803.40 | — |
|  | 1 | −687.31 | 26.09 | 65.59 | 141.02 | 86.24 |
|  | 2 | −645.93 | 3.01 | 70.65 | 140.78 | 98.41 |
|  | 3 | −636.51 | 2.53 | 61.40 | 126.83 | 98.67 |
|  | 4 | −642.16 | 2.34 | 85.68 | 122.04 | 98.76 |
|  | 5 | −632.53 | 8.78 | 84.11 | 187.39 | 95.37 |

Figure 2:
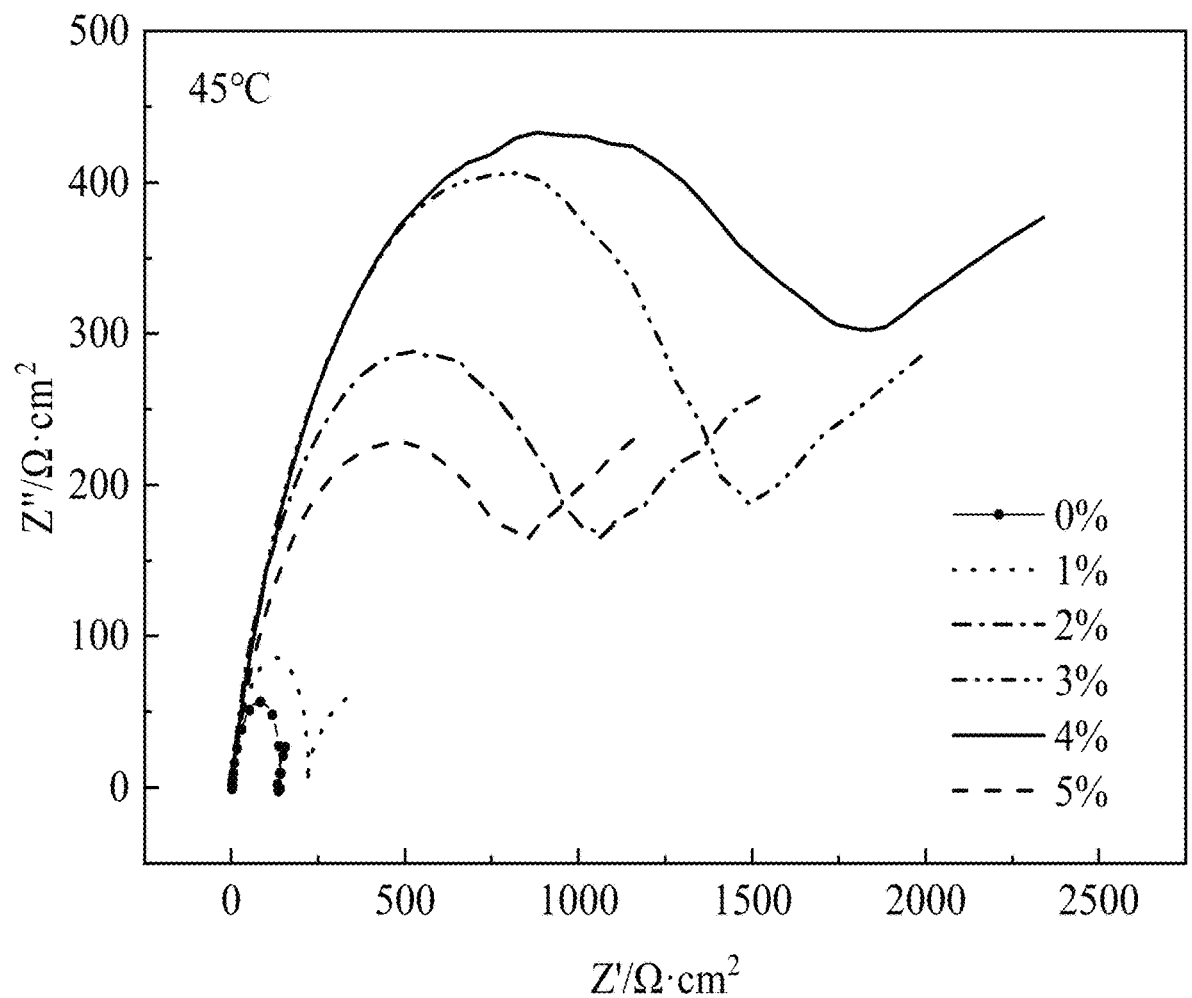
FIG. 2 is an impedance spectrogram of L245N steel in Embodiment 3 in corrosion solutions with different concentrations of corrosion inhibitors.

FIG. 2 is an electrochemical impedance spectrogram of the corrosion experiment of the L245N steel in corrosion solutions with different concentrations (0% to 5%) of corrosion inhibitors. With the increase of the concentration of the corrosion inhibitor, a curvature radius of a capacitive reactance arc in a high frequency region is increased first and then decreased, which indicates that, with the increase of the concentration of the corrosion inhibitor, a protective layer formed by molecules of the corrosion inhibitor adsorbed on the surface of the L245N steel becomes more complete, and a charge transfer resistance is gradually increased. However, when an addition amount of the corrosion inhibitor is too high, there is an adverse impact on the adsorption of the molecules of the corrosion inhibitor. EIS parameters are fitted by an equivalent circuit diagram, and parameters after fitting are shown in Table 4 below.

TABLE 4

Fitting Results of electrochemical impedance spectroscopy

| Temperature ° C. | Inhibitor concentration % | $R_s$ $\Omega \cdot cm^2$ | $C_{dl}$ $\mu F \cdot cm^{-2}$ | $n_{dl}$ | $R_{ct}$ $\Omega \cdot cm^2$ | $C_f$ $\mu F \cdot cm^{-2}$ | $n_f$ | $R_f$ $\Omega \cdot cm^2$ | W $\Omega \cdot cm^2 \cdot s^{1/2}$ | $\eta$ (%) |
|---|---|---|---|---|---|---|---|---|---|---|
| 45 | 0 | 3.08 | 224.51 | 0.84 | 130.6 | 122.65 | 0.77 | 288.6 | — | — |
|  | 1 | 1.94 | 122.91 | 0.81 | 242.6 | 101.83 | 0.80 | 377.9 | 0.0587 | 46.17 |
|  | 2 | 2.55 | 48.61 | 0.80 | 1105 | 77.22 | 0.82 | 530.7 | 0.0084 | 88.18 |
|  | 3 | 2.86 | 54.45 | 0.82 | 1477 | 55.14 | 0.83 | 593.1 | 0.0081 | 91.16 |
|  | 4 | 2.93 | 46.57 | 0.82 | 1834 | 47.50 | 0.82 | 667.3 | 0.0067 | 92.88 |
|  | 5 | 2.40 | 85.04 | 0.80 | 876.3 | 88.75 | 0.81 | 539.4 | 0.0091 | 85.10 |

Figure 3A:
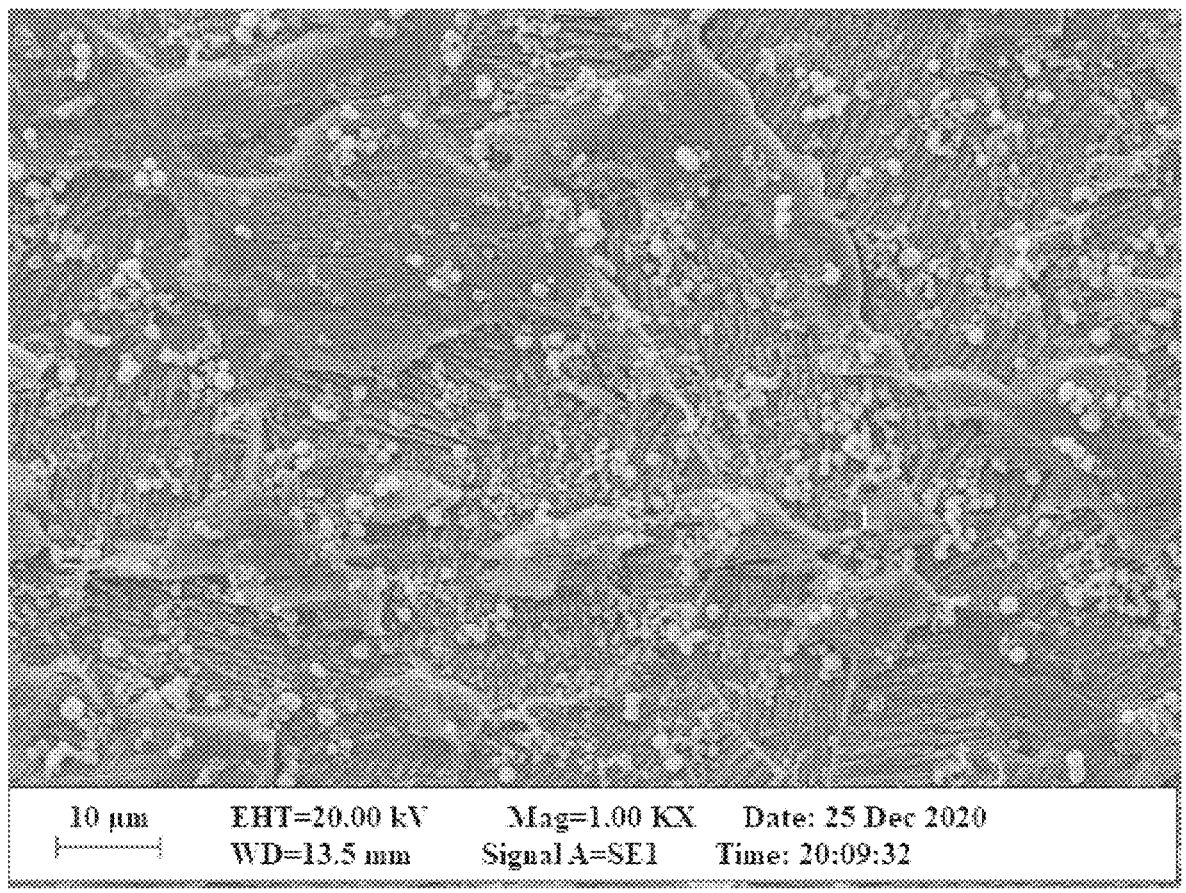
FIG. 3A shows corrosion morphologies of L245N steel in Embodiment 3 after being soaked in corrosion solutions not added with a corrosion inhibitor at a volume ratio of 4% for 24 hours.
Figure 3B:
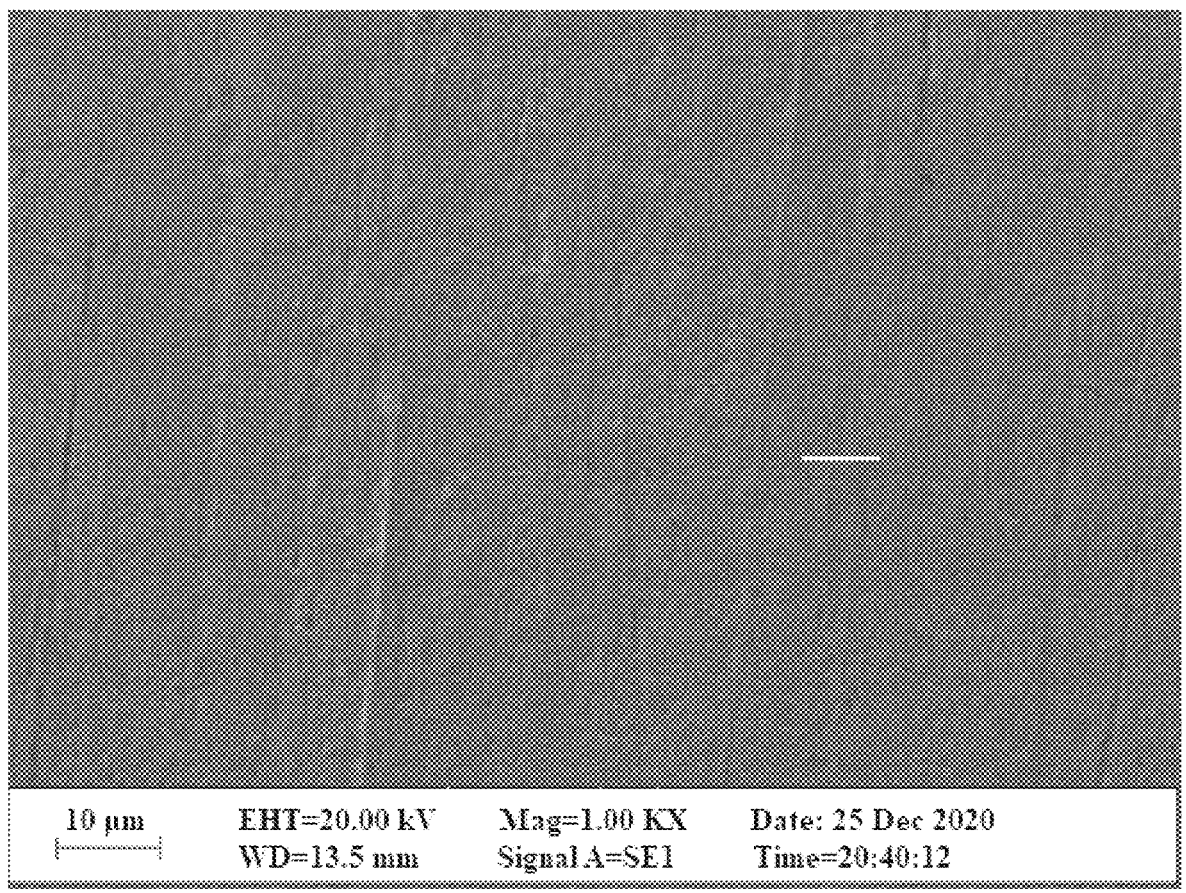
FIG. 3B shows corrosion morphologies of L245N steel in Embodiment 3 after being soaked in corrosion solutions added with a corrosion inhibitor at a volume ratio of 4% for 24 hours.

FIG. 3A and FIG. 3B respectively show corrosion morphologies of the samples of the L245N steel after being corroded in corrosion solutions not added with the corrosion inhibitor and added with the corrosion inhibitor at the volume ratio of 4% for 24 hours. The scanning electron microscope had an accelerating voltage (EHT) of 20 kV, a working distance (WD) of 13.5 mm, and a magnification factor (MAG) of 1000 times, and an SE1 detector was used. A corrosion situation in the corrosion solution not added with the corrosion inhibitor was serious, and more granular corrosion products were formed and adsorbed to the metal surface. However, a corrosion degree of the L245N steel in the corrosion solution added with the corrosion inhibitor was light, the metal surface was flat, and there was no obvious large-area corrosion, which indicated that the corrosion inhibitor could effectively suppress the corrosion of the L245N steel in the corrosion solution.

The above are only the preferred embodiments of the present invention, and do not limit the present invention in any form. Although the present invention has been disclosed by the preferred embodiments, the preferred embodiments are not intended to limit the present invention. Those skilled in the art can make some changes or modifications as equivalent embodiments with equivalent changes by using the technical contents disclosed above without departing from the scope of the technical solutions of the present invention. However, for the contents not departing from the scope of the technical solutions of the present invention, any simple modifications, equivalent changes and modifications made to the above embodiments according to the technical essence of the present invention are still included in the scope of the technical solutions of the present invention.

We claim:

1. A plant composite corrosion inhibitor for an oil field, comprising the following in parts by mass: 15 parts to 25 parts of first plant ingredient extraction product, 9 parts to 18 parts of second plant ingredient extraction product, 6 parts to 9 parts of corrosion inhibition synergist, and 30 parts to 50 parts of organic solvent;

wherein the raw material of the first plant ingredient extraction product is marigold, and the raw materials of the second plant ingredient are luffa leaves, guava leaves and eclipta.

2. The plant composite corrosion inhibitor for the oil field according to claim 1, wherein preparation steps of the first plant ingredient specifically comprise: washing fresh marigold, disinfecting the washed marigold with anhydrous ethanol, drying the disinfected marigold at 40° C., then grinding and crushing the dried marigold, placing obtained marigold powder in an extraction kettle of a supercritical extractor, using supercritical $CO_2$ as a solvent to flow upwardly at a constant flow rate of 0.012 kg/min for 6 hours, using anhydrous ethanol as a co-solvent to send into a preheating container in front of the extraction kettle through a high performance liquid chromatography pump, wherein the extraction kettle has an extraction pressure of 36.7 MPa and an extraction temperature of 40.5° C., when each cycle is ended, depressurizing an effluent flow in a heated back pressure valve, collecting an extract in a cooled two-chamber collection container, dissolving zeaxanthin and a derivative thereof in ethanol, and removing the solvent by evaporation to obtain the first plant ingredient.

3. The plant composite corrosion inhibitor for the oil field according to claim 1, wherein preparation steps of the second plant ingredient specifically comprise: washing, disinfecting, drying and crushing fresh luffa leaves, guava leaves and eclipta according to a mass ratio of 5:8:9, adding anhydrous ethanol according to a liquid-material ratio of 13 mL/g, soaking the mixture for 36 hours, carrying out normal temperature ultrasonic treatment on the soaked mixture by an ultrasonic cleaner for 30 minutes, then removing an insoluble substance by depressurized suction filtration, and concentrating the solution to ⅓ volume through rotary evaporation at 80° C. by a rotary evaporator to obtain the second plant ingredient.

4. The plant composite corrosion inhibitor for the oil field according to claim 1, wherein the corrosion inhibition synergist is prepared by mixing potassium iodide, 8-hydroxyquinoline and sodium dodecyl benzene sulfonate according to a mass ratio of 3:4:2.

5. A preparation method of the plant composite corrosion inhibitor for the oil field according to claim 1, comprising the following steps of:
   (1) raw material preparation: preparing the first plant ingredient, the second plant ingredient and the corrosion inhibition synergist for later use; and
   (2) preparation: adding the first plant ingredient, the second plant ingredient and the corrosion inhibition synergist in different parts by mass into the organic solvent, and uniformly stirring and mixing the mixture to obtain the plant composite corrosion inhibitor.

* * * * *